Sept. 1, 1959 S. P. JOHNSON 2,901,833
CREEP MEASURING DEVICE
Filed March 17, 1958 3 Sheets-Sheet 1
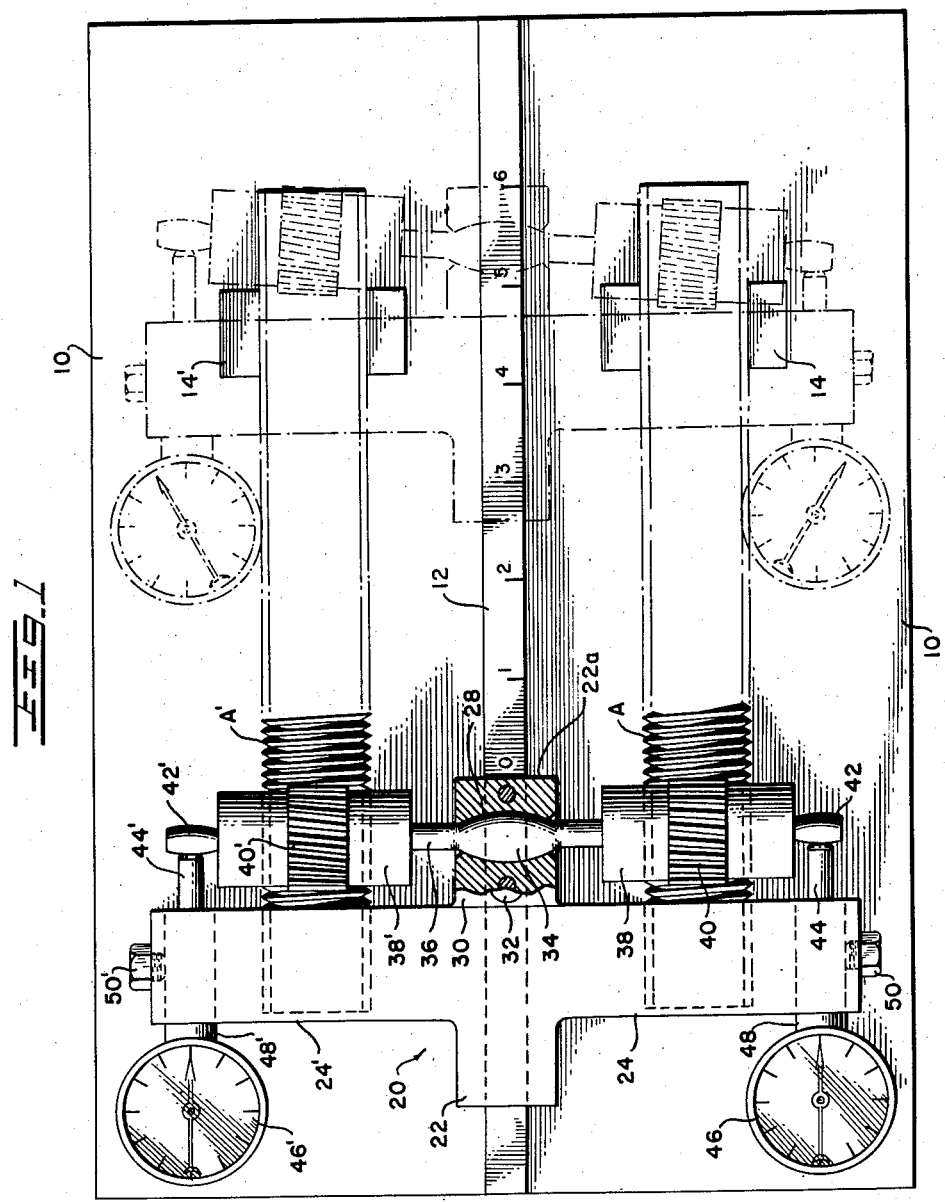
INVENTOR
SIDNEY P. JOHNSON Sept. 1, 1959    S. P. JOHNSON    2,901,833
CREEP MEASURING DEVICE
Filed March 17, 1958    3 Sheets-Sheet 2
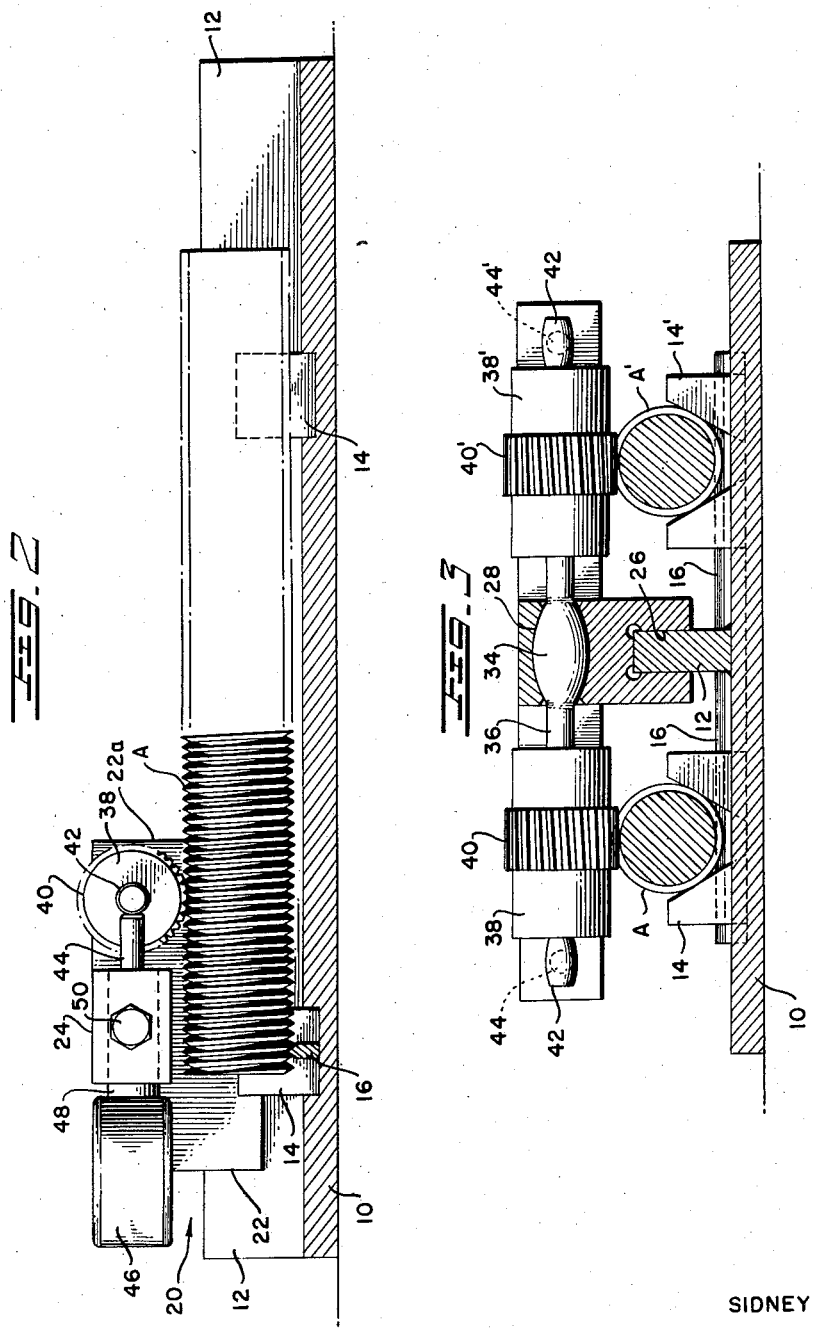
INVENTOR
SIDNEY P. JOHNSON
BY
*B. L. Zangwill*
ATTORNEYS Sept. 1, 1959 S. P. JOHNSON 2,901,833
CREEP MEASURING DEVICE
Filed March 17, 1958 3 Sheets-Sheet 3

INVENTOR.
SIDNEY P. JOHNSON
BY
*B. L. Zanguill*
ATTORNEYS.

United States Patent Office 2,901,833
Patented Sept. 1, 1959

2,901,833

CREEP MEASURING DEVICE

Sidney P. Johnson, Washington, D.C.

Application March 17, 1958, Serial No. 722,107

12 Claims. (Cl. 33—199)

(Granted under Title 35, U.S. Code (1952), sec. 266)

The invention described herein may be manufactured and used by or for the Government of the United States of America for governmental purposes without the payment of any royalties thereon or therefor.

This invention relates to gauges or measuring instruments and more particularly to stretch measuring devices for bolt studs and the like.

The Bureau of Ships, United States Navy, has been spending thousands of dollars annually for high temperature bolt studs for repair and replacement in naval ships. A great number of the replaced studs can be salvaged and re-used, provided their stretch in use has not exceeded a certain amount, approximately 1% of original length. At present, however, there appears to be no available inexpensive and practical device for measuring the stretch of these studs, and no practical method of sorting the re-usable studs from those that have stretched too much and must be scrapped.

Accordingly, an object of this invention is to provide a practical and inexpensive gauge for determining stretch in used bolt studs or the like.

A further object of this invention is to provide a gauge for quickly comparing the length of a used stud with that of a new similar stud of correct size.

A further object of the invention is to provide a gauge for comparing the number of threads per unit length of a questionable stud with that of a standard stud.

The invention together with the above and other objects and advantages is set forth in more technical detail in the following description and accompanying drawings, wherein:

Fig. 1 is a top plan view, partly in horizontal section, of a stretch gauge illustrating a first embodiment of the invention;

Fig. 2 is a side elevational view, partly in longitudinal vertical section, of the gauge shown in Fig. 1;

Fig. 3 is an end elevational view and partial transverse vertical section of the gauge shown in Figs. 1 and 2;

Figure 4:
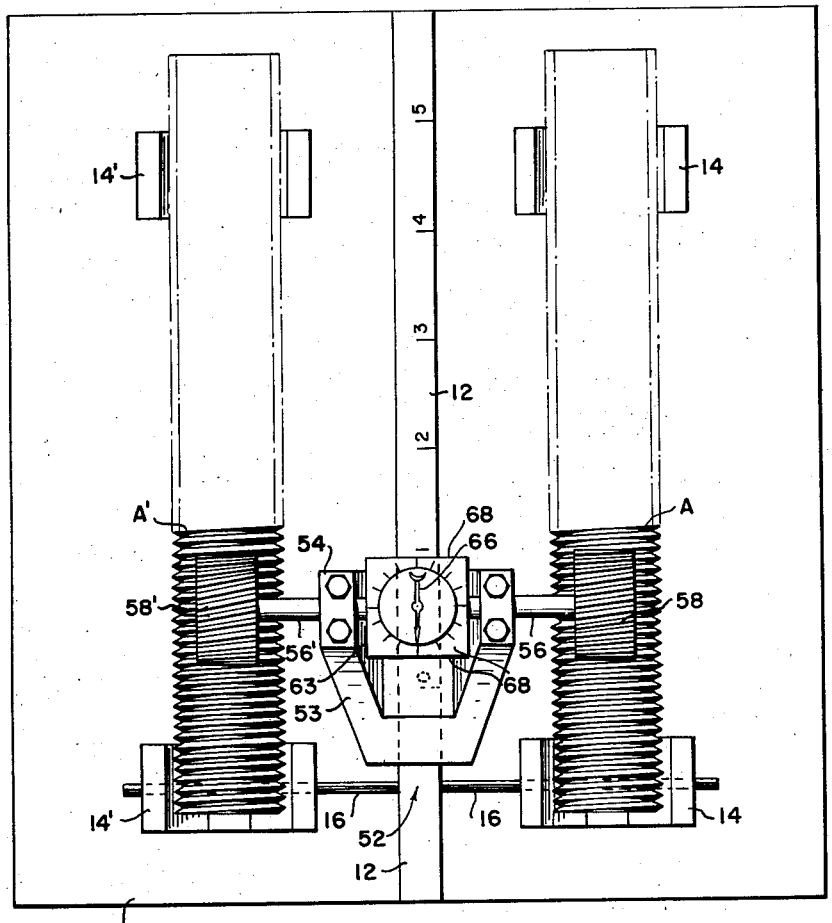
Fig. 4 is a top plan view of a stretch gauge illustrating a second embodiment of the invention.

Referring now to the drawings, first to Figs. 1-3, which illustrate a first embodiment of the invention, the gauge comprises a relatively heavy base plate 10 made of steel or like material and having a longitudinal, centrally located guide rail 12 welded thereto. The top surface of the guide rail is graduated in inches and marked 0, 1, 2, 3, etc. Two pairs of V-blocks 14 and 14' are removably embedded in the upper surface of the base plate and are adapted to hold in parallel relation a new correct size stud A and a used stud A', respectively, which studs, as shown in Fig. 1, are held in parallel relation with the guide rail 12. As pointed out hereinafter, the V-blocks may be made adjustable for holding and aligning different sized studs. A knife edge 16 is embedded in the base block transversely thereof. As shown in Figs. 2 and 3, the knife edge may be formed as an integral unit with the forward V-blocks, it may be a separate element in front of the forward V-blocks, or each of the forward V-blocks may have a separate knife edge. In any event, the knife edge is used to align the first thread groove on each of the studs and to prevent accidental longitudinal movement of the studs relative to the base.

Mounted above the guide rail for movement thereon is a carriage 20, which carriage is formed with a longitudinal portion 22 having a pair of arms 24 and 24' extending transversely thereof. The longitudinal portion of the carriage is formed with a slot 26 (Fig. 3) in the bottom thereof, which slot is of substantially the same width as that of the guide rail, whereby the carriage is neatly slidable upon the guide rail.

The carriage is provided with a swivel bearing 28 having a removable cap 30 held in place by a pair of machine screws 32. The bearing cavity is substantially barrel-shaped and is adapted to receive and rotatably support a similarly shaped portion 34 of a transverse shaft 36. The bearing and swivel joint allow complete rotation of the shaft about a horizontal axis and partial rotation about a vertical axis. A pair of drums 38 and 38' are fixedly mounted on the shaft 36 for rotation therewith and the drums are provided with feelers in the form of substantially helical ring gears 40 and 40', the helix angles of which gears are substantially the same as that of the threads of the studs being compared, the studs being threaded from end to end with helical threads. Mounted on the ends of shaft 36 are arcuated or barrel-shaped members 42 and 42', which members bear against plungers 44 and 44', respectively, of a pair of dial indicators 46 and 46'. The dial indicators are formed with cylindrical portions 48 and 48', through which the plungers move, and which cylindrical portions are fitted in like cylindrical bores in the arms 24 and 24' of the carriage and held therein by set screws 50 and 50'.

As pointed out hereinbefore, the stretch gauges in accordance with this invention are relatively inexpensive so that a separate gauge may be provided for each of the various sizes—diameter and number of threads per inch—of studs to be gauged. However, if desired, a single gauge may have adjustable or interchangeable parts for different size studs. For example, the V-blocks may be adjustable or various sized V-blocks may be provided. Also, the helical ring gears may be removable and replaceable by ring gears of different sizes; the subassembly of shaft, drums and ring gears may be replaced by other subassemblies to take care of different size studs; or separate carriages may be provided, each mounting a different subassembly for different size studs.

In operation of the Figs. 1-3 embodiment of the invention, with the new or standard stud A and the used stud A' in place in their respective V-blocks, with the first thread groove on each of the studs resting on the knife edge, with the dial plungers 44 and 44' in contact with members 42 and 42' and the dials each set at zero, the carriage is pushed to the left, Fig. 1, along the guide rail to the inch mark nearest the left end of the studs. For this purpose, the vertical surface 22a of the carriage may be lined up with the desired inch mark on the top surface of the guide rail. The carriage, having been raised during this movement, is now lowered so that the helical gears 40 and 40' are in mesh with the threads of studs A and A', respectively. The carriage is now pushed to the right (Fig. 1) along the guide rail, whereupon, the helical gears being in mesh with the threads on the studs, the helical gears, the drums and the shaft are rotated in unison about the horizontal axis. However, assuming that the used stud A' has stretched in use, due to the stretch of the used stud causing an increase in the pitch of the threads (each thread a small amount) the helical gear 40' will travel further from the starting point than will the helical gear 40 in mesh with the standard stud. This greater movement of the one helical gear over the other causes the shaft to swivel in the bearing about its vertical axis, as shown in broken lines in Fig. 1, which swivel action causes movement of the dial plungers, which in turn causes the dial indicators to change setting. Now then, the sum of the dial indicator movement divided by the inches that the carriage has travelled along the guide equals the percentage stretch of the used stud.

Instead of the percentage stretch of the used stud over the standard stud being taken as a criterion, the change in the number of threads per unit length may be used in determining which studs may be salvaged and which must be scrapped. That is, the standard stud having a greater number of threads per unit length than a stretched stud, the helical gear in mesh with the threads of the stretched stud, due to the swivel connection, will travel farther in a given number of revolutions than will the helical gear in mesh with the standard stud. Thus, the angular or swivel movement of the shaft upon which the helical gears are fixed may be used to determine percentage stretch and/or change in the number of threads per unit length of a used stud over a standard stud.

In practice and as a convenience, a chart or graph, not shown, may be provided, wherein the sums of dial readings are plotted against inches traveled and the percentage stretch and/or threads per unit length read off.

Figure 5:
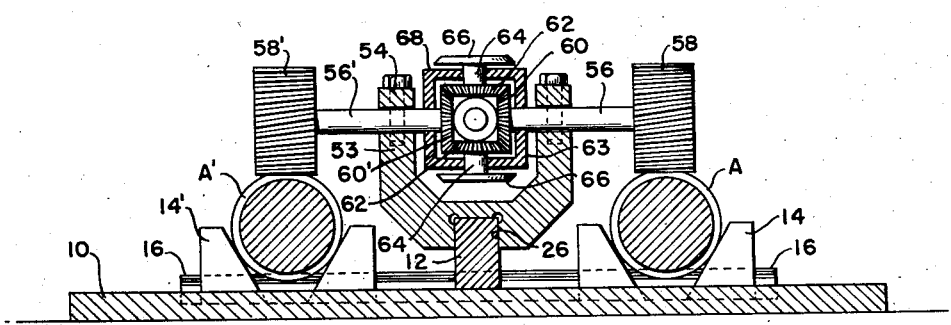
Fig. 5 is an end elevational view, partly in transverse vertical section, of the gauge shown in Fig. 4.

Referring now to Figs. 4 and 5 of the drawings, wherein a second embodiment of the invention is illustrated, which second embodiment is somewhat similar to the first except for the means for measuring stretch. That is, the base plate 10, guide rail 12, V-blocks 14 and 14', knife edge 16 and the manner of aligning the studs to be compared, in the second embodiment, are substantially identical with those of the first embodiment.

In the second embodiment, the carriage 52 is formed with a U-shaped portion 53 having bearings 54 formed in the upper ends thereof, which bearings rotatably support the measuring device. The measuring device comprises a pair of shafts 56 and 56' having feelers in the form of helical gears 58 and 58' affixed to their outer ends and bevel gears 60 and 60' affixed to their inner ends. The helical gears are adapted to mesh with the threads on the studs A and A' being compared and function in generally the same manner as the helical gears 40 and 40' of the first embodiment. The bevel gears 60 and 60' are in mesh with four spider gears 62, only two of which are shown, thereby forming a differential gearing. The differential gears are contained within a cubical differential housing or cage 63, which housing is rotatably supported on the shafts 56 and 56' and it in turn rotatably supports four shafts 64, only two of which are shown, which latter shafts are affixed to the four spider gears and of which shafts each has a pointer or hand 66 affixed to the outer end thereof. Each of the four faces 68 of the cubical housing in which the shafts 64 are journaled is formed as a dial and in cooperation with its pointer 66 gives a measurement of creep in the used stud, as described hereinafter.

In operation of the Figs. 4 and 5 embodiment, the standard stud A and the used stud A' are lined up as before. The carriage is set on the zero mark on the guide rail with the helical gears 58 and 58' in mesh with the threads on studs A and A'. Now, the carriage is moved along the guide rail whereupon the helical gears are rotated. However, the helical gear shafts 56 and 56' are held perpendicular to the axis of the studs by the journal mounting of these shafts in the carriage, thus, the helical gear 58 in mesh with the standard stud A will rotate more than the helical gear 58' in mesh with the stretched stud A'. This difference in rotation causes the differential spider gears 62 to rotate, this in turn causes rotation of the shafts 64 and the pointers 66 affixed thereto. It is to be noted that the cubical differential housing 63 is free to rotate relative to the shafts 56 and 56' so that one or more of the dial faces of the housing is always in view and one or more of the indicators on the outside of the faces can always be read. The indicators, which are graduated for use with a charted table of values, give an indication of percentage stretch and/or the number of threads per unit length of the used stud. Thus, with the second embodiment of the invention, as with the first embodiment, used studs can be quickly sorted into reusable studs and scrap studs.

It should be understood, of course, that the foregoing disclosure relates to only two embodiments of the invention and that numerous modifications or alterations may be made therein without departing from the spirit and scope of the invention as set forth in the appended claims.

What is claimed is:

1. A stretch gauge for comparing the number of threads per unit length of bolt studs comprising a base member, means on the base member for supporting a pair of bolt studs in aligned relation, a carriage mounted on the base for linear movement relative thereto and to the bolt studs supported thereon, feeler means mounted on the carriage for linear movement therewith and rotary movement relative thereto, said feeler means being mounted on the carriage in position to contact the bolt studs for rotary movement thereby, and indicating means actuated by rotary movement of the feeler means for indicating a variation in the number of threads per unit length of one of the bolt studs over the other of such bolt studs, upon linear motion of the carriage relative to the bolt studs.

2. A stretch gauge as set forth in claim 1 wherein the feeler means includes a pair of gears rotatably mounted on the carriage in a manner that one of such gears is in mesh with the threads of one of the pair of bolt studs, whereas the other of the gears is in mesh with the threads of the other of the bolt studs, whereupon linear movement of the carriage relative to the bolt studs causes rotary movement of each of the pair of gears.

3. A stretch gauge as set forth in claim 2 wherein the pair of gears are each helical gears in mesh with helical threads of the bolt studs and wherein the pair of helical gears are mounted on the carriage for unitary rotary movement relative to each other and to the carriage.

4. A stretch gauge as set forth in claim 2 wherein the pair of gears are each helical gears in mesh with helical threads of the bolt studs and wherein the pair of helical gears are mounted on the carriage for independent rotary movement relative to each other and to the carriage.

5. A stretch gauge as set forth in claim 4 wherein the indicating means includes a dial, and a differential gearing mechanism connecting the dial with the pair of helical gears for indicating a variation of rotary movement of one of the pair of helical gears over the other of such gears.

6. A stretch gauge as set forth in claim 2 wherein the indicating means includes a dial actuated by rotary movement of the gears in mesh with the bolt studs for indicating a variation in the number of threads per unit length of one of the bolt studs over that of the other of the bolt studs.

7. A stretch gauge as set forth in claim 2 wherein the indicating means includes a pair of dials actuated by rotary movement of the pair of gears in mesh with the threads of the pair of bolt studs.

8. A stretch gauge as set forth in claim 2 wherein the indicating means includes a dial, and differential gearing mechanism connecting the pair of gears to the dial for indicating a variation in rotary movement of one of such gears over the other.

9. A stretch gauge for comparing used with unused bolt studs, comprising a base member having a guide rail positioned thereon, means on opposite sides of the guide rail for holding a used and an unused bolt stud in parallel relation to the guide rail, a carriage mounted on the guide rail for movement relative thereto and to the two bolt studs, feeler means mounted on the carriage for movement therewith and relative thereto, said feeler means being adapted to contact the threads of the used and of the unused bolt studs, and indicator means mounted on the carriage and actuated by the feeler means for indicating stretch of the used bolt stud over the unused bolt stud, said feeler means including a pair of gears mounted on the carriage for linear movement therewith and rotary movement relative thereto, one of said gears being adapted to mesh with the threads of the used bolt stud and the other of said gears being adapted to mesh with the threads of the unused bolt stud.

10. A stretch gauge as set forth in claim 9 wherein the feeler means includes a shaft mounted intermediate its length on the carriage for linear movement therewith and rotary movement relative thereto and wherein the pair of gears includes a pair of helical gears affixed to opposite ends of the shaft with one of such gears adapted to contact the threads of the used bolt stud and the other of such gears adapted to contact the threads of the unused bolt stud for rotation of such gears and said shaft in unison, said shaft being mounted on the carriage by a swivel connection in a manner that for a given linear movement of the carriage relative to the bolt studs one end of the shaft is moved away from the carriage whereas the other end of the shaft is moved toward the carriage.

11. A stretch gauge as set forth in claim 10 wherein the indicator means includes a pair of dials with one of such dials positioned adjacent one end of the shaft and the other of such dials positioned adjacent the opposite end of the shaft and means operative by movement of opposite ends of the shaft away from and toward the carriage for actuating said dials.

12. A stretch gauge as set forth in claim 9 wherein the pair of gears are mounted on the carriage by separate shafts adapted for independent rotary movement relative to each other and to the carriage, and wherein the indicator means includes a differential gearing mechanism connected between the separate shafts and having a dial operated thereby for indicating relative movement between the pair of gears.

References Cited in the file of this patent

UNITED STATES PATENTS

| | | |
|---|---|---|
| 2,433,421 | Bowness | Dec. 30, 1947 |
| 2,597,644 | Johnson | May 20, 1952 |